United States Patent Office 3,115,529
Patented Dec. 24, 1963

3,115,529
MANUFACTURE OF TRICHLOROETHYLENE AND PERCHLOROETHYLENE
Kenneth L. Lindsay, Baton Rouge, La., assignor to Ethyl Corporation, New York, N.Y., a corporation of Virginia
No Drawing. Filed Sept. 29, 1961, Ser. No. 141,599
5 Claims. (Cl. 260—654)

This invention relates to a process for the manufacture of trichloroethylene and perchloroethylene, especially to an improved process for the manufacture of these chlorohydrocarbons by thermal chlorination.

Many processes are available for the manufacture of trichloroethylene and perchloroethylene which are important commercial solvents. Such processes often involve expensive photo chemical chlorination techniques as well as thermal and catalytic methods. These processes often call for the use of expensive starting materials, often produce excess carbonization because of the high temperatures used, call for expensive catalytic materials which are often lost in the process for entrainment and often involve a host of other operating problems.

While many serious problems are encountered in present processes for manufacture of trichloroethylene and perchloroethylene by thermal chlorination methods this type of process is yet one of the most important available to commerce. A serious problem, for example, in a thermal process is that due to pyrolysis of the hydrocarbon or chlorohydrocarbon reactant. Thus, direct chlorination of methane or ethane at high chlorine:alkane ratios poses a difficult problem due to the enormous adiabatic temperature rise which must be controlled in almost instantaneous time to prevent severe pyrolysis. A prior art approach to the solution of this problem is generally to employ a high degree of dilution, as for example in U.S. 2,577,388. Another solution to the problem is to conduct the reaction in several stages with very high recycle to the various stages. Such solutions to these problems however, in themselves, produce new problems not the least of which is that relating to the complexity of the process itself necessitating, among other things, increased expenditures for the initial cost of the equipment as well as increased maintenance costs.

Another serious problem is that relating to separation of by-products from the trichloroethylene and perchloroethylene. Thus, for example, in manufacturing trichloroethylene from 1,2-dichloroethane, wherein unreacted 1,2-dichloroethane remains in the product or where it is generated from another hydrocarbon or chlorohydrocarbon, its separation from the trichloroethylene is extremely difficult because of the close relative volatility of these chlorohydrocarbons. Also, where 1,1,2-trichloroethane is present in the product, whether produced from another chlorohydrocarbon or from an unreacted 1,1,2-trichloroethane starting material the separation of this chlorohydrocarbon from perchloroethylene is extremely difficult because of the close relative volatility of 1,1,2-trichloroethane and perchloroethylene.

Consequently, there is a real need in the art for a simplified thermal chlorination process which can achieve flexibility of operation to manufacture trichloroethylene and perchloroethylene in the desired quantities, particularly for such a process utilizing a relatively cheap raw material. Also, there is a need for a thermal chlorination process wherein difficult separation problems do not exist.

Quite surprisingly, it has been found that 1,1,1-trichloroethane (methyl chloroform) can be converted to trichloroethylene and perchloroethylene in a simple one-step thermal chlorination process and without occurrence of the many difficult problems encountered in other thermal chlorination processes for manufacturing these chlorohydrocarbon solvents. Pursuant to this invention trichloroethylene and perchloroethylene can be produced in exceptionally high purity and in good yield without the formation of a large number and quantity of by-products, and particularly without the formation of those by-products which pose extremely difficult separation problems. Moreover, the present invention provides a process wherein serious pyrolysis problems do not occur. The present discovery that 1,1,1-trichloroethane is especially suitable as a raw material for the production of trichloroethylene and perchloroethylene is all the more surprising for 1,1,1-trichloroethane is known to be an extremely corrosive material when placed in contact with metals, but yet the present process does not contemplate the use of elaborate equipment.

It is therefore an object of the present invention to overcome the foregoing an other difficulties and to provide a low temperature process wherein high purity trichloroethylene and perchloroethylene can be produced from low cost starting materials and without the formation of large amounts of chlorohydrocarbon impurities, particularly those impurities which are difficult or impossible to separate from the desired product. Specifically, it is an object of the present invention to provide a process for the direct thermal chlorination of 1,1,1-trichloroethane to form trichloroethylene and perchloroethylene without the formation of large amounts of by-products such as 1,2-dichloroethane or 1,1,2-trichloroethane, or both, which cause separation problems; these particular chlorohydrocarbons, for example, being particularly difficult to separate from the trichloroethylene and perchloroethylene, respectively. It is also an object of the present invention to provide a new and continuous one-step process for the low temperature thermal chlorination of 1,1,1-trichloroethane in a fluid bed wherein is realized increased flexibility as regards the ratio and quantity of the product manufactured, as well as increased overall efficiency and economy.

These and other objects are achieved according to the present invention which comprises a combination of steps including contacting together the reactants 1,1,1-trichloroethane and chlorine in a fluidized bed at a temperature ranging from about 300° C. to about 500° C., and preferably from about 400° C. to about 450° C. to provide optimum yield of high purity product. The reaction is generally conducted at about atmospheric pressure, though a positive pressure can be employed. A preferred feature of this invention, in fact, is that when larger amounts of perchloroethylene are preferred the use of elevated pressure upon the reaction will favor the production of perchloroethylene in preference to trichloroethylene. Where supra-atmospheric pressure is used to increase perchloroethylene yield the range of pressure used should preferably be from about 10 p.s.i.g. to about 100 p.s.i.g., and most preferably from about 10 to about 50 p.s.i.g. Another advantage of increased pressure also is that it favors greater total production of trichloroethylene and perchloroethylene because the throughput of the reactants through the reaction zone can be considerably increased.

Gaseous chlorine and vaporized 1,1,1-trichloroethane are passed continuously into a fluidized reaction zone wherein the chlorination reaction occurs. The 1,1,1-trichloroethane is preferably preheated, mixed with chlorine, then fed into the reaction zone. The chlorine and 1,1,1-trichloroethane are generally provided to the reaction zone at a molar ratio of chlorine:1,1,1-trichloroethane of from about 0.5:1 to about 1.9:1. Preferably the molar ratio of chlorine:1,1,1-trichloroethane is from about 0.7:1 to about 1.5:1 to provide maximum formation of high purity trichloroethylene and perchloroethylene at optimum yields. A molar ratio of chlorine:1,1,1-trichloroethane of from about 0.7:1 to about 1.2:1 has been found, in combination with other conditions, to provide particularly excellent results.

The following non-limiting examples present data illustrative of the present invention. All parts are given in weight units, temperatures in degrees centigrade (° C.), and pressure as pounds per square inch gauge (p.s.i.g.) except as otherwise specified.

In each of the examples preheated 1,1,1-trichloroethane and chlorine are mixed together and then fed into a reactor containing a fluidized bed consisting essentially of finely divided nickel- and iron-free Ottawa sand. Above the fluidized bed is provided a disengaging space and into this space is extended a condenser, cooled by refrigeration. The products of reaction are removed from the overhead of the reactor and condensed within the refrigerated condenser. The condensed product was analyzed, where the boiling point of the material was very low, by means of a mass spectrometer and, where the boiling point of the material was high, by the use of an infrared spectrometer.

*Example I*

243 parts of 1,1,1-trichloroethane were preheated to a temperature of 280–283° C. and then fed with 60 parts of chlorine to a fluidized reaction zone. Thus, the molar ratio chlorine:1,1,1-trichloroethane was about 0.47:1. The reaction was maintained at an average temperature of about 400° C. and at substantially atmospheric pressure. Pursuant to these conditions it was found that considerable quantities of trichloroethylene was formed in only one pass through the reactor but the formation of perchloroethylene was quite low. No difficult separation problems were encountered and the desired products were easily separated by fractional distillation.

A product having the following approximate analysis was obtained:

|  | Percent |
|---|---|
| Vinylidene chloride | 24.3 |
| 1,1,1-trichloroethane (unreacted) | 5.6 |
| Trichloroethylene | 54.3 |
| Perchloroethylene | 6.2 |
| 1,1,2-tetrachloroethane | 6.5 |
| Pentachloroethane | 2.7 |
| Hexachloroethane and other | 0.2 |

In the following example is demonstrated conditions wherein the production of perchloroethylene is further increased but yet without any loss in the production of trichloroethylene. In fact, the amount of trichloroethylene is increased and yet the amount of perchloroethylene produced is substantially doubled. It will also be observed that the production of vinylidene chloride is reduced from that amount of this chlorohydrocarbon produced in the above example.

*Example II*

Example I was repeated except that 84 parts of chlorine was mixed with 213 parts of 1,1,1-trichloroethane (molar ratio chlorine:1,1,1-trichloroethane 0.74:1), and the mixture then fed into the reaction zone.

Analysis of the condensate from the reactor showed the following product distribution:

|  | Percent |
|---|---|
| Vinylidene chloride | 17.8 |
| 1,1,1-trichloroethane (unreacted) | 1.0 |
| Trichloroethylene | 57.6 |
| Perchloroethylene | 13.0 |
| 1,1,2-tetrachloroethane | 5.6 |
| Pentachloroethane | 3.8 |
| Hexachloroethane | 0.3 |
| Unknown | 0.9 |

The following example shows another combination of conditions wherein the amount of perchloroethylene is further increased, and in fact again substantially doubled and yet the amount of trichloroethylene formed is not reduced, but is in fact essentially the same as in Example I. It will again be noted that the quantity of vinylidene chloride formed in the reaction is yet further decreased.

*Example III*

Example I was again repeated except that 98 parts of chlorine and 167 parts of 1,1,1-trichloroethane were mixed together and fed to the reaction zone. This corresponds to a chlorine:1,1,1-trichloroethane ratio of approximately 1.11:1.

Pursuant to these conditions the following distribution of products was obtained:

|  | Percent |
|---|---|
| Vinylidene chloride | 10.3 |
| 1,1,1-trichloroethane (unreacted) | 2.1 |
| Trichloroethylene | 53.3 |
| Perchloroethylene | 25.0 |
| 1,1,1,2-tetrachloroethane | 5.1 |
| Pentachloroethane | 2.4 |
| Hexachloroethane | 0.9 |
| Unknown | 0.9 |

The foregoing runs thus show that a high ratio of trichloroethylene:perchloroethylene can be obtained and, in fact, that a considerable amount of trichloroethylene can be obtained while perchloroethylene formation is suppressed. These examples also show that the quantity of perchloroethylene can be increased, where this is desirable, and yet without substantial reduction of the amount of trichloroethylene formed. Also, these runs show that a co-product consisting of almost eighty percent trichloroethylene and perchloroethylene can be conveniently obtained.

In none of the foregoing examples are any troublesome separation problems encountered when the reaction product mixtures are separated by distillation. Further, pyrolysis of the product is insignificant.

In the run immediately following it will be observed that a considerable amount of perchloroethylene is formed while, on the other hand, trichloroethylene formation is quite low. It will be noted that the amount of vinylidene chloride formed is substantially nil.

*Example IV*

When 213 parts of 1,1,1-trichloroethane was preheated to 260° C. and mixed with 159 parts of chlorine (molar ratio chlorine:1,1,1-trichloroethane 1.41:1) and fed into the reaction at a temperature of about 425° C. perchloroethylene and trichloroethylene were formed.

It was found that the product was of the following approximate composition:

|  | Percent |
|---|---|
| Vinylidene chloride | 0.3 |
| Trichloroethylene | 16.7 |
| Perchloroethylene | 59.3 |
| 1,1,2-tetrachloroethane | 10.4 |
| Pentachloroethane | 1.0 |
| Hexachloroethane | 3.3 |
| Unknown | 9.0 |

High purity trichloroethylene and perchloroethylene are quite readily separated from the reaction product by distillation.

The following example presents illustrative data wherein the amount of trichloroethylene and perchloroethylene in the product is quite high. In fact the total of these two chlorohydrocarbon solvents in the reaction product mixture is greater than 80 percent.

*Example V*

Chlorine and 1,1,1-trichloroethane, the 1,1,1-trichloroethane being preheated to a temperature of 283° C., were mixed together at a molar ratio of chlorine:1,1,1-trichloroethane of 1.49 and fed into a fluidized reaction zone. The reaction was maintained at substantially atmospheric pressure and a temperature of approximately 500° C. was maintained during the reaction.

The distribution of the products obtained from the reaction was as follows:

| | Percent |
|---|---|
| Trichloroethylene | 32.1 |
| Perchloroethylene | 48.6 |
| 1,1,1,2-tetrachloroethane | 4.8 |
| Pentachloroethane | 4.1 |
| Hexachloroethane | 4.2 |
| Unknown | 6.2 |

High purity perchloroethylene and trichloroethylene are easily separated by distillation.

The following example demonstrates a run wherein perchloroethylene is formed while trichloroethylene formation is suppressed.

*Example VI*

The foregoing run was repeated except that a pressure of from 13.8 to about 14.5 p.s.i.g. was maintained upon the reaction. Also, the molar ratio of chlorine:1,1,1-trichloroethane was maintained at 1.70.

The following distribution of products was obtained:

| | Percent |
|---|---|
| Trichloroethylene | 2.4 |
| Perchloroethylene | 54.7 |
| 1,1,1,2-tetrachloroethane | 9.4 |
| Pentachloroethane | 14.8 |
| Hexachloroethane | 14.8 |
| Unknown | 3.9 |

No trouble is encountered in separation of high purity perchloroethylene by distillation.

From the foregoing description and illustrative data it is apparent that the present improved thermal chlorination method provides for the selective preparation of trichloroethylene or perchloroethylene, or both, from 1,1,1-trichloroethane pursuant to a combination of conditions. While wide and significant departures from the ranges of conditions specified produce significantly low yields of the desired products and other adverse effects it is apparent that some variation of the conditions is possible without departing from the spirit and scope of the invention.

The chlorination reaction is conducted in a fluidized bed, or within a body of granular particles maintained in fluidized condition by the flow of reaction gases through the mass. This mode of operation leads to a substantially uniform temperature throughout the reaction zone and avoids many of the difficulties of the prior art. The size of the particles can be of considerable variation, the only required feature is that the particles be capable of fluidization by the velocity of the entering gases. Thus, a convenient particle size is from about 120 mesh to about 325 mesh (U.S. Sieve No.). While the particle size distribution of the particles can be less than this, substantial quantities of such small particles cause entrainment and pluggage problem. The presence of substantial amounts of larger particles, on the other hand, do not provide proper fluidity.

Any type of fluidized particles can be used so long as substantially inert in the reaction. Suitable catalytic materials include, for example, alumina, graphite, pumice, silica and the like. Low surface area catalytic materials are preferable.

Generally the superficial linear velocity of the gases through the zone should be from about 0.2 to about 1.5 feet per second and preferably from about 0.4 to about 1.2 feet per second.

As stated, a feature of this invention is that very high temperature is not essential. Thus, in stationary fixed bed catalytic processes high temperature is sometimes necessary to get significant conversion of the reactants, but yet in these units contact time is necessarily short, on the order of a fraction of a second, to prevent significant pyrolysis. In the present invention however contact time can be extended to as much as about 10 seconds without significant degradation of the desired products.

Another feature of this invention is that the reaction can be conducted in a simple iron or steel pot type reactor, elaborate equipment not being required.

Having described the invention, what is claimed is:

1. A process for the manufacture of trichloroethylene and perchloroethylene comprising contacting together within a fluidized reaction zone vaporized 1,1,1-trichloroethane and chlorine which are fed into the reaction zone at a molar ratio of chlorine:1,1,1-trichloroethane of from about 0.5:1 to about 1.9:1 while maintaining the temperature of the zone within a range of from about 300° C. to about 500° C., the fluidized reaction zone being a fluidized bed of substantially inert particles.

2. A process for the manufacture of trichloroethylene and perchloroethylene comprising contacting together within a fluidized reaction zone vaporized 1,1,1-trichloroethane and chlorine which are fed into the zone at a chlorine:1,1,1-trichloro-ethane ratio of from about 0.7:1 to about 1.5:1 while maintaining a temperature ranging from about 400° C. to about 450° C., the fluidized reaction zone being a fluidized bed of substantially inert particles.

3. The process of claim 2 being further characterized by being conducted at a pressure of from about 10 p.s.i.g. to about 100 p.s.i.g.

4. The process of claim 2 being further characterized by being conducted at a pressure of from about 10 p.s.i.g. to about 50 p.s.i.g.

5. A process for the manufacture of trichloroethylene and perchloroethylene comprising contacting together within a fluidized reaction zone vaporized 1,1,1-trichloroethane and chlorine which are fed into the reaction zone at a chlorine:1,1,1-trichloroethane ratio of from about 0.7:1 to about 1.5:1 while maintaining a pressure of between about 10 p.s.i.g. to about 100 p.s.i.g. and a temperature ranging from about 400° C. to about 450° C., said zone containing a fluidized bed consisting essentially of finely divided nickel- and iron-free sand.

References Cited in the file of this patent

UNITED STATES PATENTS

| 2,843,638 | Theis et al. | July 15, 1958 |
| 2,957,922 | Weiner | Oct. 25, 1960 |

FOREIGN PATENTS

| 561,327 | Canada | Aug. 5, 1958 |